United States Patent
Vesely et al.

[15] 3,678,104
[45] July 18, 1972

[54] HYDROXYLATION OF AROMATIC ACIDS

[72] Inventors: Jerome A. Vesely, Park Ridge; Louis Schmerling, Riverside, both of Ill.

[73] Assignee: Universal Oil Products Company, Des Plaines, Ill.

[22] Filed: Sept. 29, 1969

[21] Appl. No.: 862,007

[52] U.S. Cl. ...................... 260/521 R, 260/520, 260/479 R
[51] Int. Cl. ........................................... C07c 65/02
[58] Field of Search ........................... 260/521 R, 520

[56] References Cited
OTHER PUBLICATIONS

Universal Oil Products Co., Chem. Abst. 68 68700n (1968)

*Primary Examiner*—Lorraine A. Weinberger
*Assistant Examiner*—John F. Tenapane
*Attorney*—James R. Hoatson, Jr. and Raymond H. Nelson

[57] ABSTRACT

The nuclear hydroxylation of a nuclearly substituted aromatic acid is accomplished by treating the acid with hydrogen peroxide in the presence of substantially anhydrous hydrogen fluoride at a temperature in the range of from about −10° to about 100° C.

6 Claims, No Drawings

HYDROXYLATION OF AROMATIC ACIDS

This invention relates to a process for the hydroxylation of aromatic acids. More particularly, the invention is concerned with a process for the nuclear hydroxylation of a substituted aromatic acid whereby one or more hydroxyl groups are introduced on the aromatic nucleus of the acid.

Hydroxylated aromatic acids are finding a wide variety of uses in the chemical field. For example, α-resorcylic acid which is 3,5-dihydroxybenzoic acid is used as an intermediate for dyes, for pharmaceuticals and for light stabilizers and resins; β-resorcylic acid which is 2,4-dihydroxybenzoic acid is also used as a dyestuff, as an intermediate in the preparation of pharmaceuticals or in the synthesis of fine organic chemicals. A third isomer of the dihydroxybenzoic acid which is gentisic acid (2,5-dihydroxybenzoic acid) is used in medicine as sodium gentisate. Another hydroxylated aromatic acid is gallic acid (3,4,5-trihydroxybenzoic acid) which is used for a variety of purposes including its use in photography, writing inks, dyeing, in the manufacture of pyrogallol which itself has many uses, as a tanning agent and in the manufacture of tannins, in paper manufacture; in synthesis of pharmaceuticals, in process engraving and lithography, etc.

It is therefore an object of this invention to provide a process for preparing hydroxylated aromatic acids. A further object of this invention is to provide a process for introducing hydroxyl substituents on the nucleus of a substituted aromatic acid to provide useful chemical compounds.

In one aspect an embodiment of this invention resides in a process for nuclear hydroxylation of an aromatic acid which possesses the generic formula:

$$R_nAr(CR_2)_mCOOH$$

in which R is independently selected from the group consisting of hydrogen, alkyl, cycloalkyl, aryl, alkaryl, aralkyl, hydroxy, alkoxy and acyloxy radicals, Ar is an aromatic hydrocarbon nucleus, n is an integer of from 1 to 3 and m is an integer of from 0 to about 10, at least one R being other than hydrogen when m is 0, which comprises treating said aromatic acid with hydrogen peroxide in the presence of hydrogen fluoride at a temperature in the range of from about −10° to about 100° C., and recovering the resultant hydroxylated aromatic acid.

A further embodiment of this invention is found in a process for the nuclear hydroxylation of an aromatic acid which comprises treating said acid with an aqueous solution of hydrogen peroxide containing from about 5 percent to about 90 percent of hydrogen peroxide in the presence of hydrogen fluoride at a temperature in the range of from about −10° to about 100° C. and at ambient pressure, and recovering the resultant hydroxylated aromatic acid.

A specific embodiment of this invention is found in the process for the nuclear hydroxylation of salicylic acid which comprises treating said acid with an aqueous solution of hydrogen peroxide containing from about 5 percent to about 90 percent hydrogen peroxide in the presence of hydrogen fluoride at a temperature in the range of from about 0° to about 40° C. and at ambient pressure, and recovering the resultant dihydroxybenzoic acids.

Other objects and embodiments will be found in the following further detailed description of the present invention.

As hereinbefore set forth the present invention is concerned with a process for introducing hydroxyl substituents on the nucleus of an aromatic acid, said hydroxylation being effected by treating a substituted aromatic acid with hydrogen peroxide in the presence of hydrogen fluoride in a manner hereinafter set forth in greater detail. While it is known that certain aromatic compounds can be hydroxylated utilizing hydrogen peroxide in the presence of hydrogen fluoride, we have found that it is impossible to hydroxylate benzoic acid in this manner. However, it has now been discovered that when an aromatic acid contains an activating substituent of the type hereinafter set forth in greater detail, the acid is reactive and may be hydroxylated to yield the desired hydroxylated aromatic acid derivative. The term "aromatic acid" as used in the present specification and appended claims will refer to these acids which contain an activating substituent.

Aromatic acids which comprise suitable starting materials for the process of this invention possess the generic formula:

$$R_nAr(CR_2)_mCOOH$$

in which R is independently selected from the group consisting of hydrogen, alkyl, cycloalkyl, aryl, alkaryl, aralkyl, hydroxy, alkoxy and acyloxy radicals, Ar is an aromatic hydrocarbon nucleus, n is an integer of from 1 to 3 and m is an integer of from 0 to about 10, at least one R being other than hydrogen when m is 0. It is contemplated that compounds in which R may comprise another carboxy group, a halogen atom or a nitro group may also be utilized provided that a second R in the molecule comprises an alkyl, hydroxy, alkoxy or acyloxy substituent, but not necessarily with equivalent results. The aromatic hydrocarbon nucleus of the formula which is designated Ar may comprise a benzene, naphthalene, anthracene, phenanthrene, chrysene, pyrene or biphenyl nucleus. Some specific examples of these acids which will undergo nuclear hydroxylation will include o-toluic acid, n-toluic acid, p-toluic acid, o-ethylbenzoic acid, m-ethylbenzoic acid, p-ethylbenzoic acid, o-propylbenzoic acid, m-propylbenzoic acid, p-propylbenzoic acid, o-isopropylbenzoic acid, m-isopropylbenzoic acid, p-isopropylbenzoic acid, o-t-butylbenzoic acid, m-t-butylbenzoic acid, p-t-butylbenzoic acid, 2,4-dimethylbenzoic acid, 2,5-dimethylbenzoic acid, 2,6-dimethylbenzoic acid, 2,4-diethylbenzoic acid, 2,5-diethylbenzoic acid, 2,6-diethylbenzoic acid, 2,4-dipropylbenzoic acid, 2,5-dipropylbenzoic acid, 2,6-dipropylbenzoic acid, 2,4-diisopropylbenzoic acid, 2,5-diisopropylbenzoic acid, 2,6-diisopropylbenzoic acid, 2,4,6-trimethylbenzoic acid, o-cyclohexylbenzoic acid, m-cyclohexylbenzoic acid, p-cyclohexylbenzoic acid, o-phenylbenzoic acid, m-phenylbenzoic acid, p-phenylbenzoic acid, o-benzylbenzoic acid, m-benzylbenzoic acid, p-benzylbenzoic acid, o-p-tolylbenzoic acid, m-p-tolylbenzoic acid, p-p-tolylbenzoic acid, salicylic acid, 4-methylsalicylic acid, 4-ethylsalicylic acid, 2,4-dihydroxybenzoic acid, o-methoxybenzoic acid, m-methoxybenzoic acid, p-methoxybenzoic acid, o-ethoxybenzoic acid, m-ethoxybenzoic acid, p-ethoxybenzoic acid, phenylacetic acid, p-methylphenylacetic acid, p-ethylphenylacetic acid, o-hydroxy-phenylacetic acid, m-hydroxyphenylacetic acid, p-hydroxyphenylacetic acid, o-methoxyphenylacetic acid, m-methoxyphenylacetic acid, p-methoxyphenylacetic acid, o-ethoxyphenylacetic acid, m-ethoxyphenylacetic acid, p-ethoxyphenylacetic acid, 2-phenylpropionic acid, 3-phenylpropionic acid, 2-(o-methylphenyl)propionic acid, 2-(m-methylphenyl)propionic acid, 2-(p-methylphenyl)propionic acid, 2-(o-hydroxyphenyl)propionic acid, 2-(m-hydroxyphenyl) propionic acid, 2-(p-hydroxyphenyl)propionic acid, 3-(o-methylphenyl)propionic acid, 3-(m-methylphenyl)propionic acid, 3-(p-methylphenyl)propionic acid, 3-(o-hydroxyphenyl)propionic acid, 3-(m-hydroxphenyl)propionic acid, 3-(p-hydroxyphenyl)propionic acid, 2-phenylbutyric acid, 3-phenylbutyric acid, 4-phenylbutyric acid, 2-(o-hydroxyphenyl)butyric acid, 2-(m-hydroxyphenyl)butyric acid, 2-(p-hydroxyphenyl)butyric acid, 3-(o-hydroxyphenyl)butyric acid, 3-(m-hydroxyphenyl)butyric acid, 3-(p-hydroxyphenyl)butyric acid, 4-(o-hydroxyphenyl)butyric acid, 4-(m-hydroxyphenyl)butyric acid, 4-(p-hydroxyphenyl)butyric acid, 2-, 3-, 4- or 5-phenyl-valeric acids, 2-, 3-, 4-, 5- or 6-phenylhexanoic acids, etc., 1-methyl-2-naphthoic acid, 1-ethyl-2-naphthoic acid, 1-propyl-2-naphthoic acid, 1-hydroxy-2-naphthoic acid, 1-phenyl-2-naphthoic acid, 1-benzyl-2-naphthoic acid, 1-p-tolyl-2-naphthoic acid, 3-methyl-2-naphthoic acid, 3-ethyl-2-naphthoic acid, 3-propyl-2-naphthoic acid, 3-hydroxy-2-naphthoic acid, 3-phenyl-2-naphthoic acid, 3-benzyl-2-naphthoic acid, 3-p-tolyl-2-naphthoic acid, the corresponding carboxylic acids of anthracene, phenanthrene, chrysene, pyrene, etc. It is to be understood that the aforementioned aromatic acids containing a reactive substituent are only representative of the class of compounds which may be used, and that the present invention is not necessarily limited thereto.

The process of this invention is effected by treating an aromatic acid of the type hereinbefore set forth in greater detail with hydrogen peroxide in the presence of a catalyst comprising hydrogen fluoride. The hydrogen peroxide may be present in an aqueous solution containing from 5 up to 90 percent or more hydrogen peroxide. The preferred hydrogen peroxide solution will contain a 30–50 percent or higher concentration of hydrogen peroxide inasmuch as when utilizing a lesser amount, the aqueous portion of the solution will tend to dilute the catalyst which is preferably charged to the reaction zone in anhydrous form. When the concentration of the hydrogen fluoride catalyst falls below a figure of about 60 to 70 percent, the reaction will slow down and eventually cease; therefore, it is necessary to maintain the concentration of hydrogen fluoride in an amount greater than 60 percent and preferably greater than 80 percent and thus necessitate the use of a relatively concentrated hydrogen peroxide solution. It is also contemplated, if so desired, that an additional compound such as boron trifluoride or a ferrous fluoborate having the formula $FeF_2 \cdot BF_3$ may be utilized as a promoter to increase the catalytic acidity and thereby permit the reaction to proceed in such a manner as to provide increased yields of the desired product. In addition, the reaction is effected under hydroxylation conditions which will include temperatures ranging from about $-10°$ up to about $100°$ C. or more and preferably at a temperature in the range of from about $0°$ to about $40°$ C. The reaction pressure which is utilized will preferably comprise ambient pressure, although somewhat higher pressure may be used, the pressure being that which is necessary to maintain a substantial portion of the reactants and the catalyst in the liquid phase.

The obtention of either a monohydroxylated aromatic acid or polyhydroxylated aromatic acid can be varied according to the amount of aromatic acid which is treated with the hydrogen peroxide. For example, if a monohydroxylated aromatic acid is desired, an excess of the starting aromatic acid will be used. Conversely, if a polyhydroxylated aromatic acid comprises the desired product, the relative amount of hydrogen peroxide which is used will be increased. Generally speaking, the aromatic acid will be present in a mole ratio in the range of from about 3:1 to about 15:1 moles of aromatic acid per mole of hydrogen peroxide, although greater or lesser amounts of aromatic acids may also be used.

The process of the present invention may be effected in either a batch or continuous type operation. For example, when a batch type operation is used, a quantity of aromatic acid is placed in an appropriate apparatus such as, for example, a stirred autoclave, along with the hydrogen fluoride. The hydrogen peroxide is added thereto and the reaction allowed to proceed for a predetermined residence time under the hydroxylation conditions hereinbefore set forth in greater detail. The residence time may vary from about 0.5 hour up to about 5 hours or more in duration. Upon completion of the desired residence time, the catalyst is purged from the reactor utilizing a stream of inert gas such as nitrogen and the reaction product thereafter recovered. Following this, the reaction product is subjected to conventional means for recovery, said means including washing the product with an inert organic solvent, neutralization of any hydrogen fluoride which may still be present, flashing off the solvent and subjecting the reaction product to fractional distillation or recrystallization to recover the desired compounds.

It is also contemplated that the process of this invention may be effected in a continuous manner of operation. When such a process is used, the aromatic acid is continuously charged to a reaction zone which is maintained at the proper operating conditions of temperature and pressure. In addition, the hydrogen peroxide in the form of an aqueous solution containing from 5 percent up to about 90 percent or more hydrogen peroxide is continuously charged to the reaction zone. The reaction is allowed to proceed in the presence of a hydrogen fluoride catalyst present in the reactor or continuously charged for a predetermined time of from about 0.01 hour to about 2 hours, following which the reactor effluent is continuously withdrawn. The hydrogen peroxide and the hydrogen fluoride may be premixed and the resulting solution fed continuously to the reactor. The reaction product is separated from the catalyst and the former is subjected to treatment similar to that hereinbefore set forth to recover the desired hydroxylated aromatic acid.

Examples of hydroxylated aromatic acids which may be prepared according to the process of this invention include 5-hydroxy-o-toluic acid, 3,5-dihydroxy-o-toluic acid, 5-hydroxy-m-toluic acid, 5-hydroxy-p-toluic acid, 3,5-dihydroxy-p-toluic acid, 5-hydroxy-2-ethylbenzoic acid, 5-hydroxy-3-ethylbenzoic acid, 3-hydroxy-4-ethylbenzoic acid, 3,5-dihydroxy-4-ethylbenzoic acid, 5-hydroxy-2-propylbenzoic acid, 5-hydroxy-3-propyl-benzoic acid, 3-hydroxy-4-propylbenzoic acid, 3,5-dihydroxy-4-propylbenzoic acid, 5-hydroxy-2-isopropylbenzoic acid, 5-hydroxy-3-isopropybenzoic acid, 3-hydroxy-4-isopropylbenzoic acid, 3,5-dihydroxy-4isopropylbenzoic acid, 5-hydroxy-o-t-butylbenzoic acid, 5-hydroxy-3-t-butylbenzoic acid 3-hydroxy-4-t-butylbenzoic acid, 3,5-dihydroxy-4-t-butylbenzoic acid, 5-hydroxy-2,4-dimethylbenzoic acid, 3-hydroxy-2,5-dimethylbenzoic acid, 5-hydroxy-2,6-dimethylbenzoic acid, 5-hydroxy-2,4,6-trimethylbenzoic acid, 3,5-dihydroxy-2,4,6-trimethylbenzoic acid, 5-hydroxy-2-cyclohexylbenzoic acid, 5-hydroxy-2-phenylbenzoic acid, 3,5-dihydroxy-4-phenylbenzoic acid, 2,3-dihydroxybenzoic acid, 3,4-dihydroxybenzoic acid, 2,5-dihydroxybenzoic acid, 3,4,5-trihydroxybenzoic acid, 2,3-dihydroxy-4-methylbenzoic acid, 2,5-dihydroxy-4-methylbenzoic acid, 2,3-dihydroxy-4-ethylbenzoic acid, 2,5-dihydroxy-4-ethylbenzoic acid, 5-hydroxy-2-methoxybenzoic acid, 5-hydroxy-2-methoxybenzoic acid, 3,5-dihydroxy-4-methoxybenzoic acid, 5-hydroxy-2-ethoxybenzoic acid, 3-hydroxy-4-ethoxybenzoic acid, 3,5-dihydroxy-4-ethoxybenzoic acid, 4-hydroxyphenylacetic acid, 2,4-dihydroxyphenylacetic acid, 4-hydroxy-3-methylphenylacetic acid, 4-hydroxy-3-ethylphenylacetic acid, 3,4-dihydroxyphenylacetic acid, 2,5-dihydroxyphenylacetic acid, 5-hydroxy-2-methoxyphenylacetic acid, 4-hydroxy-3-methoxyphenylacetic acid, 2,5-dihydroxy-4-methoxyphenylacetic acid, 2-(4-hydroxyphenyl)propionic acid, 2-(2,4-dihydroxyphenyl)propionic acid, 3-(4-hydroxyphenyl) propionic acid, 3-(2,4-dihydroxyphenyl)propionic acid, 2-(4-hydroxy-3-methylphenyl)propionic acid, 3-(2-hydroxyphenyl)propionic acid, 3-(2,5-dihydroxyphenyl)propionic acid, 2-(4-hydroxyphenyl) butyric acid, 3-(4-hydroxyphenyl)butyric acid, 4-(4-hydroxyphenyl) butyric acid, 4-hydroxy-1-methyl-2-naphthoic acid, 3,4-dihydroxy-1-methyl-2-naphthoic acid, 1,4-dihydroxy-2-naphthoic acid, 3,4-dihydroxy-1-naphthoic acid, etc. It is to be understood that the aforementioned compounds are only representative of the class of hydroxylated aromatic acids which may be prepared, and that the process of the present invention as described herein is not necessarily limited thereto.

The following examples are given to illustrate the process of the present invention which, however, are not intended to limit the generally broad scope of the present invention in strict accordance therewith.

EXAMPLE I

In this example 136 g. (1.0 mole) of phenylacetic acid was placed in a stainless steel turbomixer autoclave. Following this 230 g. (11.5 moles) of hydrogen fluoride was charged thereto. Thereafter 10.9 g. of a 30 percent hydrogen peroxide solution was gradually charged to the reactor during a period of 10 minutes. The mole ratio of phenylacetic acid to hydrogen peroxide was 10:1. The mixture was stirred for an additional period of 10 minutes, the temperature during the entire 20 minute contact time being in a range of from $0°$ to $6°$ C. by means of an ice bath. At the end of the contact time the hydrogen fluoride was swept out of the autoclave with a stream of nitrogen for a period of about 2 hours before the autoclave was opened.

The reaction product which comprised 134.7 g. was transferred to a beaker and the reactor parts were washed with benzene, the washings being added to the reaction product. The solution was decanted into another beaker thereby separating out a small amount of an aqueous acid phase which contained some benzene-insoluble product. The decanted benzene solution was treated to remove residual hydrogen fluoride, filtered under suction and distilled to remove benzene and unreacted phenylacetic acid. The benzene-insoluble product was combined with the product in the aqueous acid phase and extracted with ether. The extract was treated to remove residual hydrogen fluoride and subjected to distillation to remove the ether. The bottoms from both product segments were combined and subjected to fractional distillation under reduced pressure, there being recovered two crystalline product components which are found by nuclear magnetic resonance analysis to be hydroxyphenylacetic acid isomers.

EXAMPLE II

In this example 207 g. (1.5 moles) of salicylic acid along with 250 cc. of a n-heptane solvent were placed in the glass liner of a one liter stainless steel turbomixer autoclave. Following this 244 g. (12.2 moles) of hydrogen fluoride was charged thereto. Thereafter 51 g. (0.15 mole) of a 30 percent aqueous hydrogen peroxide solution was gradually charged to the reactor, the peroxide addition being accomplished during a period of 16 minutes. The mixture was stirred for an additional period of 14 minutes, the temperature during the entire contact time being maintained in a range of from about 23° to about 26° C. At the end of the predetermined contact time the hydrogen fluoride was swept out of the autoclave utilizing a stream of nitrogen for a period of 2 hours.

After opening the autoclave the reacted product was transferred to a beaker and the reactor parts were washed with benzene, the washings being added to the reaction product. Upon decanting the reaction product into a second beaker a small amount of an aqueous acid phase which contained some benzene-insoluble product was separated out. The decanted benzene solution was treated with calcium carbonate to remove residual hydrogen fluoride, filtered under suction and distilled to remove the benzene and unreacted salicylic acid. The benzene-insoluble product which remained in the reactor was combined with the product in the aqueous acid phase and extracted with ether. This extracted product was also treated to remove residual hydrogen fluoride and subjected to distillation to remove the ether. The combined product segments were subjected to fractional distillation under reduced pressure, there being recovered a mixture of dihydroxybenzoic acids which were found by means of infrared analysis and nuclear magnetic resonance to correspond to a 35 mole percent yield of 2,3-dihydroxybenzoic acid, a 35 mole percent yield of 2,5-dihydroxybenzoic acid, and a combined yield of approximately 18 mole percent of 2,4-dihydroxybenzoic acid and 2,6-dihydroxybenzoic acid.

EXAMPLE III

To a stainless steel turbomixer autoclave was charged 136 g. (1.0 mole) of o-toluic acid and 250 cc. of n-pentane which acted as a diluent. The autoclave was immersed in an ice bath so that the temperature was maintained at a range of from about 0° to about 3° C. during the entire reaction time. Following this 215 g. (10.8 mole) of a 30% hydrogen fluoride solution was charged to the reactor and thereafter 16.4 g. of a 30 percent hydrogen peroxide solution was slowly added to the mixture during a period of about 28 minutes. After completion of the hydrogen peroxide addition the mole ratio of o-toluic acid to hydrogen peroxide was 7.0:1. The mixture was stirred for an additional period of 17 minutes while, as hereinbefore set forth, the temperature was maintained in a range of from 0° to 3° C. Upon completion of the total contact time of 45 minutes, the hydrogen fluoride was purged from the reactor by means of a stream of nitrogen for a period of 2 hours. The reaction mixture was then poured into a vessel and the autoclave parts washed with benzene. The washings were combined with the reaction product which was thereafter treated in a manner similar to that set forth in the above examples. The presence of 5-hydroxy-o-toluic acid was determined by means of infrared and nuclear magnetic resonance analysis.

EXAMPLE IV

When hydrogen peroxide was added to a stirred mixture of benzoic acid and liquid hydrogen fluoride in a manner similar to that hereinbefore described, while maintaining the temperature of the reaction at about 25° C., no conversion of the benzoic acid to hydroxybenzoic acid or dihydroxybenzoic acid was found.

EXAMPLE V

In this experiment 186 g. (1.0 mole) of 1-methyl-2-naphthoic acid along with 250 cc. of n-pentane is charged to a turbomixer autoclave, said autoclave being immersed in an ice bath in order to maintain the temperature in a range of from about 0° to about 5° C. Following this 215 g. (10.8 mole) of hydrogen fluoride is charged to the autoclave and thereafter 21.8 g. of a 30 percent hydrogen peroxide solution is slowly added thereto during a period of about 30 minutes. Upon completion of the addition of the hydrogen peroxide the reaction mixture is stirred for an additional 30 minutes to bring the total contact time to 60 minutes. At the end of this period the hydrogen peroxide is purged from the autoclave by means of a stream of nitrogen, said purge being accomplished in a period of 2 hours.

The reaction mixture, after opening of the autoclave, is transferred to a vessel, the autoclave is washed with benzene and the benzene washings are added to the reaction mixture. Upon decanting the solution into another vessel, an aqueous acid phase which contains some benzene-insoluble product will separate out. The decanted benzene solution is treated with sodium carbonate to remove residual hydrogen fluoride, filtered under suction and subjected to fractional distillation to remove the benzene and unreacted 1-methyl-2-naphthoic acid. The benzene-insoluble product which remains in the reactor is combined with the product in the aqueous acid phase and extracted with ether. The extract is again treated to remove residual hydrogen fluoride and thereafter subjected to fractional distillation to remove the ether. The remainder is combined with the other product segment and subjected to fractional distillation under reduced pressure whereby the desired 4-hydroxy-1-methyl-2naphthoic acid is recovered.

EXAMPLE VI

In this example 152 g. (1.0 mole) of 4-methoxybenzoic acid along with 250 cc. of n-pentane diluent is placed in an autoclave and 148 g. (7.4 mole) of hydroxy fluoride is charged thereto. Following this 21.8 g. of a 30 percent hydrogen peroxide solution is slowly added to the autoclave during a period of about 30 minutes. During the hydrogen peroxide addition time and for an additional stirring period of 30 minutes, the temperature of the autoclave is maintained in a range of from about 0° to about 5° by means of an ice bath. upon completion of the 60 minute contact time the hydrogen fluoride was flushed from the autoclave by utilizing a stream of nitrogen for a period of 2 hours.

The reaction product is treated in a manner similar to that set forth in the above examples. After fractional distillation has been completed infrared analysis will disclose the presence of a mixture of hydroxymethoxybenzoic acid, chiefly 3-hydroxy-4-methoxybenzoic acid.

We claim as our invention:

1. A process for the nuclear hydroxylation of an aromatic acid which possesses the generic formula:

$R_n ArCOOH$ in which R is independently selected from the group consisting of alkyl, hydroxy, alkoxy, acyloxy, cycloalkyl aryl, alkaryl and aralkyl radicals, said Ar and aryl are phenyl, n is an integer of from 1 to 3, which comprises treating said aromatic acid with 230% aqueous solution of hydrogen peroxide in the presence of hydrogen fluoride of at least 60 percent concentration at a temperature in the range of from about −10° to about 100° C. and recovering the resultant hydroxylated aromatic acid.

2. The process as set forth in claim 1 in which said aromatic acid is an alkyl-substituted aromatic acid.

3. The process as set forth in claim 1 in which said aromatic acid is a hydroxy-substituted aromatic acid.

4. The process as set forth in claim 1 in which said aromatic acid is o-toluic acid and said hydroxylated aromatic acid is 5-hydroxy-o-toluic acid.

5. The process as set forth in claim 1 in which said aromatic acid is salicylic acid and said hydroxylated aromatic acid is a dihydroxybenzoic acid.

6. The process as set forth in claim 1 in which said aromatic acid is 4-methoxybenzoic acid and said hydroxylated aromatic acid is a hydroxy-4-methoxybenzoic acid.

* * * * *